United States Patent [19]
Fukushima et al.

[11] Patent Number: 5,869,115
[45] Date of Patent: Feb. 9, 1999

[54] PROCESS FOR PRODUCING SEASONING

[75] Inventors: Yaichi Fukushima; Makoto Okayasu; Misao Sugishita, all of Noda, Japan

[73] Assignee: Kikkoman Corporation, Noda, Japan

[21] Appl. No.: 975,452

[22] Filed: Nov. 21, 1997

[30] Foreign Application Priority Data

Dec. 9, 1996 [JP] Japan ................... 8-342399

[51] Int. Cl.$^6$ ................................ A21D 2/00
[52] U.S. Cl. .................. 426/20; 426/21; 426/46; 426/589; 426/634; 426/638
[58] Field of Search ............... 426/20, 21, 46, 426/589, 634, 519, 520, 524, 638

[56] References Cited

U.S. PATENT DOCUMENTS

| | | | |
|---|---|---|---|
| 3,912,822 | 10/1975 | Yokotsuka et al. | 426/44 |
| 4,346,114 | 8/1982 | Hagiwara | 426/18 |

FOREIGN PATENT DOCUMENTS

| | | |
|---|---|---|
| 0 640 294 A | 3/1995 | European Pat. Off. . |
| 0 727 153 A | 8/1996 | European Pat. Off. . |
| 71028837 | 8/1993 | Japan . |
| 59051757 | 9/1993 | Japan . |

OTHER PUBLICATIONS

"Moromi Mash of Soy Sauce. IV Brewing high Nitrogen /low salt soy sauce using processed raw materials", Journal of the Japan Soy Sauce Research Institute, (1983) 9(1) 24–28 Abstract Only.

*Primary Examiner*—Nina Bhat
*Attorney, Agent, or Firm*—Banner & Witcoff, Ltd.

[57] ABSTRACT

A process for producing a seasoning having high nitrogen concentration by hydrolyzing a proteinaceous material with enzyme, characterized in that common salt is added to the decomposed Moromi or the Moromi temperature is lowered, then the Moromi is allowed to stand and press filtered by a conventional method.

2 Claims, No Drawings

PROCESS FOR PRODUCING SEASONING

BACKGROUND OF THE INVENTION

1. Field of the Invention

The present invention relates to a process for producing a seasoning by hydrolyzing a proteinaceous material with enzyme.

2. Description of the Related Prior Art

Soy sauce, which is a typical example of the seasonings produced by hydrolyzing the proteinaceous materials with enzyme, requires a long time for its production as the process involves many steps such as koji incubation, preparation, fermentation, aging, pressing and finishing, but its peculiar color, taste and flavor are yielded in the course of this process, and it is one of the seasonings indispensable for the eating habits of the Japanese people.

Since soy sauce is produced by using common salt of high concentration from the initial stage of the preparation for preventing spoilage, there is naturally a limitation on the degree of enzymatic decomposition of the proteinaceous material. Consequently, the nitrogen concentration of the product is about 1.8% at the highest, and it has been quite difficult to produce soy sauce with a nitrogen concentration over 2% according to a conventional natural brewing method.

On the other hand, in the production of various processed foods, there is a large demand for the seasonings with a high nitrogen concentration, i.e. those with a stronger Umami (flavor enhancement), aside from color and flavor, and in order to meet this request, various proposals have been made, with some having been put to practical use, on the seasonings of the type produced by hydrolyzing proteinaceous material with enzyme in a short time.

For example, it has been proposed to produce a seasoning from a solution of proteinaceous material decomposed with enzyme at a high temperature without using salt or in the presence of low-concentration common salt, or by fermenting and aging this solution of decomposed proteinaceous material in the presence of common salt.

However, the enzymatically decomposed seasonings produced by decomposing the proteinaceous material in a short time, have the problem that the components of the undecomposed dregs or sediment are hard to remove, and even in the product which has been subjected to dregs removing treatment after heat-treatment, the dregs may form during storage of the product. Also, the product tends to lack a mild flavor because of no or unsufficient aging.

Especially the seasonings with high nitrogen content have a high probability of forming dregs during storage, and thus pose a serious problem in this respect.

SUMMARY OF THE INVENTION

The object of the present invention is to overcome the above problems, that is, to provide a process for producing a seasoning of a high nitrogen content which has no possibility of forming dregs during storage of the product after heating treatment and dregs removal treatment.

In accordance with the present invention, there is provided a process for producing a seasoning of a high nitrogen content by hydrolyzing a proteinaceous material with enzyme, characterized in that common salt is added to Moromi or the Moromi temperature is lowered, or both of said treatments are carried out after a hydrolyzing process, and then the Moromi is allowed to stand and thereafter subjected to a press filtration by a conventional method.

PREFERRED EMBODIMENTS OF THE INVENTION

The present invention is described in detail below.

The proteinaceous materials used in the present invention include vegetable protein materials such as whole soybean, de-fatted soybean, wheat, wheat gluten and corn gluten, animal protein materials such as fish meat, fish meat protein and livestock meat, and microbial protein materials such as yeast. These proteinaceous materials may be used either singly or in combination.

The conventional methods can be used for hydrolyzing these proteinaceous materials with a proteolytic enzyme; for instance, they can be hydrolyzed by first denaturing the proteinaceous material by heating or with an alcohol and then adding an appropriate proteolytic enzyme preparation, or by inoculating koji mold capable of producing proteolytic enzyme into a proteinaceous material which has been subjected to a denaturing treatment, culturing them to form koji incubation, and then directly hydrolyzing it.

The enzyme preparations usable for the above hydrolysis include commercially available proteolytic enzymes and the microbes capable of producing them, for example, liquid cultures of koji mold (liquid koji), koji-containing solutions in which the cells have been removed from said liquid koji, enzyme obtained from partial purification of said liquid by a conventional method, solid koji obtained by inoculating koji mold capable of producing proteolytic enzyme into a solid medium comprising wheat bran and culturing the mold, enzyme obtained from water extraction of solid koji, and partially purified enzyme thereof according to a conventional method.

The decomposition conditions may be optionally decided provided that they are safe from causing spoilage or rancidity; usually decomposition is carried out at a temperature within the range of 37° to 55° C. for one to 7 days by adding, if necessary, not more than 15% of common salt. Moreover, a fermentation may be effected at the same time as the decomposition of the Moromi by adding yeast together with enzyme preparation. The yeast added is ones belonging to the Saccharomyces genus which are usually used in the production of soy sauce. These yeasts are used in an amount of $10^5$–$10^7$/ml on the basis of the weight of the Moromi. Thereby, the decomposition of the proteinaceous materials and the fermentation may be simultaneously effected to give alcohols in the Moromi. The alcohols formed are useful for preventing spoilage and rancidity of Moromi and hence, the concentration of salt and the temperature at the decomposition may be lowered. Additionally, the color of the Moromi becomes stable because sugars are consumed during the fermentation and aroma of soy sauce is given.

The thus obtained decomposed Moromi is usually directly subjected to pressing and filtration to prepare a seasoning, but in the present invention, the Moromi temperature is lowered or common salt is added with keeping the temperature unchanged, or both of these treatments are carried out, at the completion of decomposition, and the thus treated Moromi is then press filtered by a conventional method, followed if necessary by heating and dregs removing treatment of the filtrate to produce a seasoning.

Thus, in the present invention, the decomposed Moromi temperature is lowered to 30° C. or below, preferably 25° C. or below, by a suitable method such as passing cold water through a jacket of the tank containing the Moromi or by contacting the Moromi with cold water through a heat exchanger, or common salt is added to the Moromi in an amount of 3% or more, preferably 8% or more, based on the Moromi. Addition of common salt is effected by directly adding common salt or a high-concentration brine to the Moromi and by mixing and stirring.

A more preferred effect can be expected by performing both of said operations, that is, adding 3% or more of common salt while lowering the Moromi temperature to 30° C. or below.

The Moromi which has thus been lowered in temperature or had common salt added thereto, or has been subjected to said both treatments, is allowed to stand as it is for 1 to 10 days, and then filtered by a conventional method, such as filtration under pressure or treatment by a filter press, to obtain a clear seasoning, and the latter is subjected if necessary to heating and dregs removing treatment by the conventional methods to give the final product.

The obtained seasoning may be offered to use either singly or as a mixture with other seasoning(s) such as soy sauce for various types of foods.

The seasoning of the present invention is mild in taste and produces no dregs or sediment even when left as it is for a long time at normal temperatures. This is considered ascribable to the fact that as the Moromi is allowed to stand after lowered in temperature or increased in common salt concentration, the dreg material is precipitated in the Moromi and separated and removed together with other solids by pressing and filtration, thus eliminating any possibility of dregs being left in the product. It is also considered that aging of the Moromi is expedited in the standing period to afford a mild taste to the produced seasoning.

EXAMPLES

The present invention is further illustrated by the following examples.

Example 1

To 16 kg of soy koji (koji mold: *Aspergillus oryzae*) obtained by a conventional method, 25 kg of wheat gluten, 12 kg of common salt and 65 liters of water were added and the mixture was mechanically stirred by a propeller and hydrolyzed at 43° C. for 96 hours. Analysis after hydrolysis showed that the mixture had a nitrogen concentration of 3.3% and a common salt concentration of 12.5%.

Then 7 kg of common salt was mixed and dissolved in the decomposed Moromi (common salt concentration: 19.5%) while the Moromi temperature was simultaneously lowered to 10° C., and the Moromi was allowed to stand for 96 hours. Then the Moromi was filtered under pressure with a filter fabric and the filtrate was adjusted to have a nitrogen concentration of 2.5% and a common salt concentration of 18%.

As a control, the decomposed Moromi was immediately subjected to filtration under pressure with a filter fabric and the filtrate was adjusted to have a nitrogen concentration of 2.5% and a common salt concentration of 18%, followed by heating and dreg removing treatment under the same conditions as described above to obtain a seasoning.

500 ml of each of these seasonings was poured into a commercially available 500 ml glass cylinder and, with the cylinder stoppered, kept therein at 20° C. or 35° C. for 30 days. Any of the seasoning samples according to the present invention produced no dregs at any storage temperature, but in the case of the control seasoning, precipitation of dregs took place 14 days after start of storage, and in 30 days there were precipitated about 15 ml of dregs in 20° C. storage and about 10 ml in 30° C. storage.

Organoleptic evaluation of these seasonings according to the triangular system gave the results shown in Table 1. In Table 1, the "number of those who gave correct answer" is the number of persons who correctly identified the product of the process of the invention, and the "Number of those who answered correctly" is the number of those persons who preferred the product. Thus, 14 persons of the 20 who correctly identified the product of the process of the invention preferred that product to the control.

TABLE 1

|  | Discrimination test | | | Taste test | |
| --- | --- | --- | --- | --- | --- |
|  | Number of panel members | Number of those who gave correct answer | Judgment | Number of those who answered correctly | Judgment |
| Present Invention | 34 | 20 | ** | 14 | ** |
| Control |  |  |  | 6 |  |

**: There is significant difference at the risk factor of 1%.

Example 2

In 100 liters of liquid koji (koji mold: *Aspergillus oryzae*) obtained by a conventional method, 40 kg of wheat gluten and 15 kg of common salt were dissolved and hydrolyzed at 42° C. for 96 hours.

The Moromi had a nitrogen concentration of 3.8% and a common salt concentration of 11.5%. In this moromi was dissolved 12 kg of common salt (common salt concentration: 20.1%), and then the Moromi temperature was lowered to 25° C., followed by standing for 5 days. Thereafter, the Moromi was filtered under pressure with a filter fabric and the filtrate was adjusted to have a nitrogen concentration N of 2.8% and a common salt concentration of 17%. The adjusted solution was heated at 80° C. for 30 minutes, then kept at 55° C. for 4 days and filtered through diatomaceous earth to obtain a seasoning product.

This seasoning product produced no dregs when kept at room temperature for 60 days.

Example 3

To 2.8 kg of partially purified soybean protein (Purina 630J produced by Fuji Purina Protein Co., Ltd.), 300 g of a commercial enzyme preparation (AO Protease produced by Kikkoman Co., Ltd.) and 7.7 liters of water were added and stirred at 55° C. for 24 hours to carry out a salt-free hydrolysis reaction. 1.8 kg of common salt was dissolved in the hydrolyzate and the mixture was allowed to stand at 20° C. for 48 hours and press filtered with a filter fabric. The nitrogen concentration of the filtrate was 3.5% and the common salt concentration was 18.0%. The filtrate was adjusted to have a nitrogen concentration of 3.0% and a common salt concentration of 17.0% and then subjected to heating and dregs moving treatment in the same way as in Example 2 to obtain a seasoning product of the present invention.

As a control, the decomposed Moromi was press filtered and the filtrate, after addition of common salt, was adjusted to have a nitrogen concentration of 3.0% and a common salt concentration of 17.0% and then subjected to heating and dreg removing treatment to obtain a control seasoning product.

Each of these sample products was packaged in bottle and kept at 20° C. for 2 weeks. The seasoning product of the present invention produced no dregs, but dregs were seen produced in the control product.

Example 4

To 16 kg of a soy sauce koji (*Aspergillus orizae*) obtained by a conventional method was added 25 kg of wheat gluten, 8 kg of common salt and 65 l of water. Thereafter, a soy sauce yeast (*Zygosaccharomyces rouxii*) was added to the Moromi in an amount that it may reach $10^6$/ml and hydrolyzed at 38° C. for 96 hours to effect the fermentation.

After the hydrolysis, the nitrogen concentration was 3.3%, the salt concentration was 8.5% and the alcohol concentration was 0.8%. Then, 7 kg of common salt were added to the Moromi after the completion of the decomposition and fermentation (salt concentration: 15.5%), and simultaneously the temperature of the Moromi was lowered till 15° C. The Moromi was allowed to stand for 80 hours as it was and press filtered using a filter cloth. The obtained filtrate was standardized so that it may reach 3.0% of the nitrogen concentration, 16% of the salt concentration and 2% of the alcohol concentration. After the adjusted filtrate was heated, dregs were removed from the filtrate to obtain a seasoning product which possessed a soy sauce-like flavor and no formation was found when the products were storaged at 20° C. and 37° C. for one month.

What is claimed is:

1. A process for producing a seasoning comprising the steps of:

(1) adding wheat gluten, common salt and/or water to liquid koji to obtain a Moromi, adjusting the common salt concentration to 0–15% and hydrolyzing the mixture at 37°–55° C. for 1–7 days:

(2) adding common salt or brine to the Moromi to let it have a common salt concentration of 15–23%, cooling the Moromi to 30° C. or less, and allowing the thus treated Moromi to stand for 2 days or longer;

(3) press filtering the Moromi after standing, separating the filtrate, diluting it with water and adjusting the filtrate to have a nitrogen concentration of 2.5–3.3% and a common salt concentration of 10–20%; and (4) subjecting the adjusted filtrate to heating and dregs removing treatment.

2. A process for producing a seasoning comprising the steps of:

(1) adding wheat gluten, common salt and/or water to liquid koji to adjust the salt concentration thereof in 0–15%, and hydrolyzing and fermenting the mixture at a temperature of 37°–45° C. for 1–7 days by adding yeast to the Moromi;

(2) adding common salt or brine to the Moromi after the hydrolysis and fermentation to let it have a salt concentration of 15–23%, cooling the Moromi to 30° C. or less and allowing the thus treated Moromi to stand for 2 day or longer;

(3) press filtering the Moromi after standing, separating the filtrate, diluting it with water and adjusting the filtrate to have a nitrogen concentration of 2.5–3.3% and a salt concentration of 10–20%; and (4) subjecting the adjusted filtrate to heating and dregs removing treatment.

* * * * *